Dec. 30, 1958 T. A. RATKOWSKI 2,866,667
CRAWLER SHOES
Filed Nov. 2, 1955 2 Sheets-Sheet 1

INVENTOR
THOMAS A. RATKOWSKI
BY *Wallace and Cannon* ATTORNEYS

Dec. 30, 1958     T. A. RATKOWSKI     2,866,667
CRAWLER SHOES

Filed Nov. 2, 1955     2 Sheets-Sheet 2

INVENTOR
THOMAS A. RATKOWSKI

BY Wallace and Cannon
ATTORNEYS

United States Patent Office 2,866,667
Patented Dec. 30, 1958

2,866,667

CRAWLER SHOES

Thomas A. Ratkowski, Chicago Heights, Ill., assignor to American Brake Shoe Company, New York, N. Y., a corporation of Delaware Application November 2, 1955, Serial No. 544,420

1 Claim. (Cl. 305—10)

This invention relates to crawler shoes for the endless track of a tractor or like track-laying vehicle.

Shoes of the foregoing kind includes a ground engaging plate that is adapted to travel with the track of the vehicle. These plates are either integral with the links of the vehicle track or are dismountably associated with the track links, and are provided on the outwardly exposed face thereof with treads or so-called grousers which may extend generally at right angles to the path of the track to afford forward and reverse traction. Thus, the purpose of the grouser is to afford increased traction, and to this end the grouser is usually of a straight, that is, uninterrupted configuration. There are certain instances, however, where it is recognized that the grousers on the shoes have not assured against slippage of the vehicle on slopes or inclines, particularly on ice or unthawed ground, and the primary object of present invention is to enable increased lateral traction to be attained to overcome the aforementioned slippages on inclines or slopes.

Specifically, the object of the present invention is to afford a crawler shoe having a grouser including a plurality of right-angled tractive off-sets between the ends thereof, such off-sets affording lateral traction and connecting intermediate tractive portions of the grouser that are parallel to one another and which afford forward and reverse traction.

Other and further objects of the present invention will be apparent from the following description and claim and are illustrated in the accompanying drawing which, by way of illustration, shows a preferred embodiment of the present invention and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claim.

Figure 1:
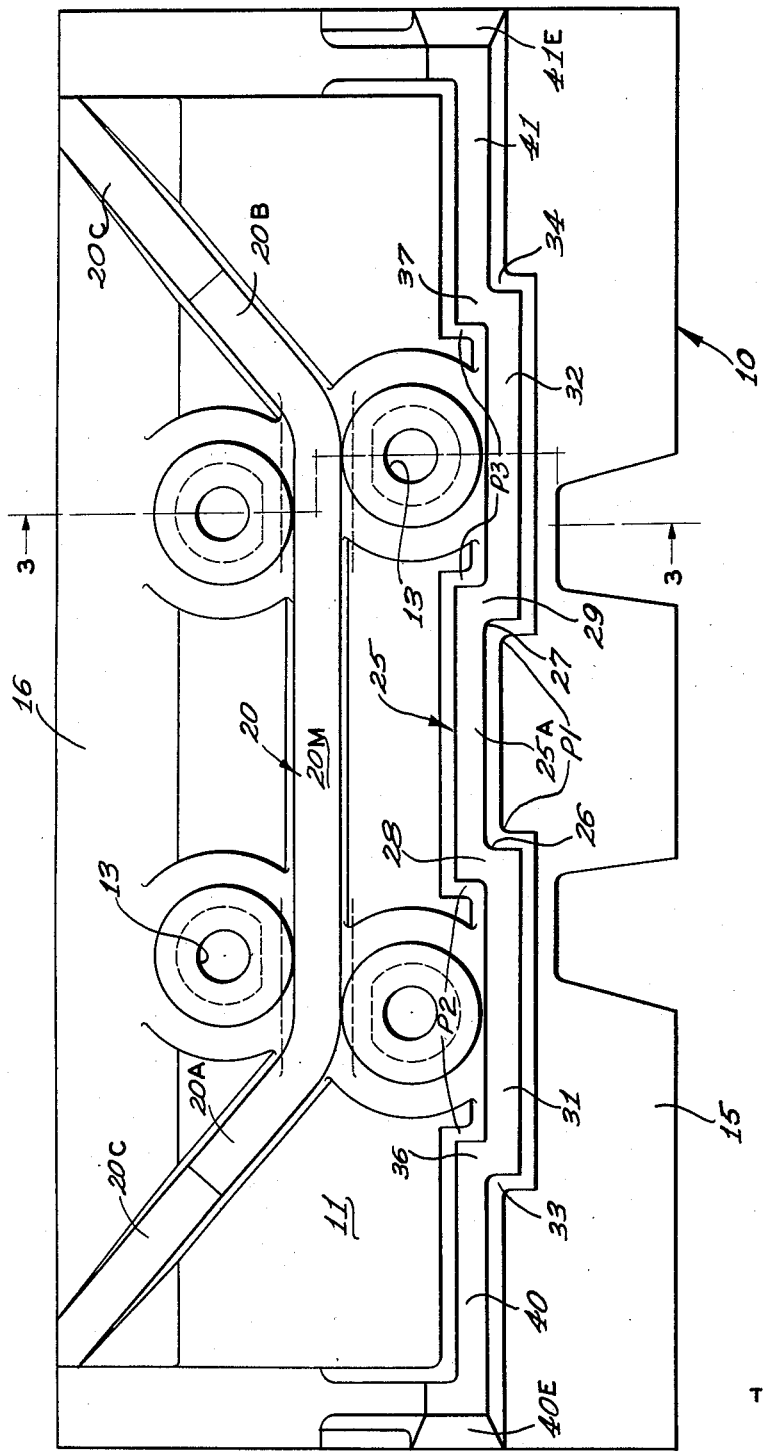
Fig. 1 is a top plan view of a tractor shoe constructed in accordance with the present invention.
Figure 2:
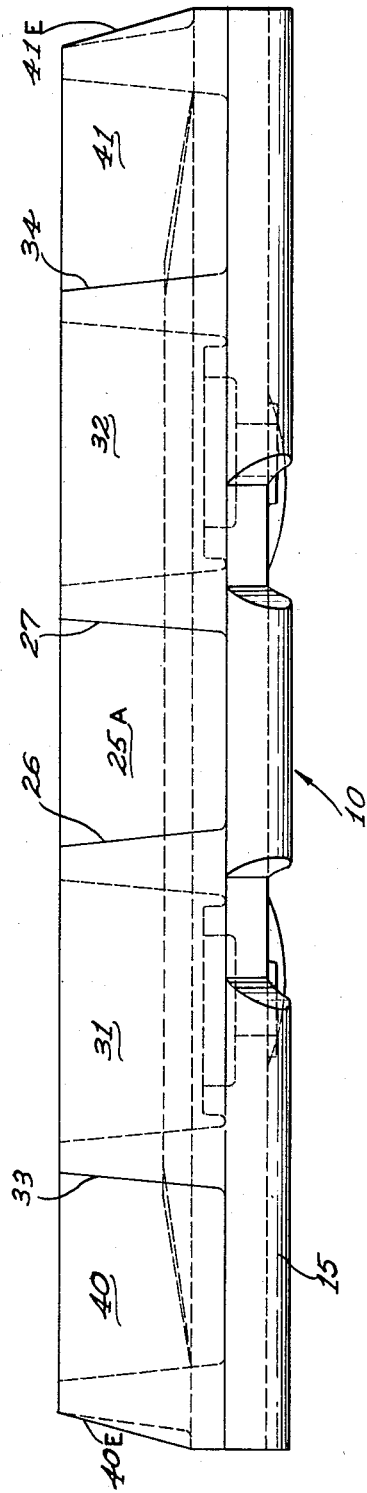
Fig. 2 is a front elevation of the shoe shown in Fig. 1.

The present invention is illustrated in the drawing as embodied in a crawler shoe 10 comprising a ground engaging plate 11 which is of general rectangular configuration. The plate 11 is adapted to be removably attached to an endless track of the usual kind for propelling a track-laying vehicle. To this end, the plate 11 is formed in the medial portion thereof with a plurality of apertures 13 through which bolt shanks are adapted to be passed to bolt the shoe or pad to the track of the vehicle.

Crawler shoes as 10 are adapted to be arranged as an endless series about the track of the vehicle, and to this end the plate 11 of the shoe is formed at the front and rear edges with bowed tongues 15 and 16 that are shaped complementary one to the other so that a tongue 15 on one shoe 10 may be disposed in complemental relation on the upper face of the tongue 16 of the next adjacent shoe.

It is desirable that shoes as 10 be reinforced. In the present instance, such reinforcement is attained by a rib 20 substantially at the medial portion of the plate 11, and this rib includes an elongated central portion 20M that extends transversely to the direction of movement of the shoe when attached to the track of the vehicle. At either end of the central portion 20M the rib 20 includes elongated arms 20A and 20B which extend in the direction of the tongue 16 as shown in Fig. 1, and the terminal portions of the arms 20A and 20B are each tapered downwardly at 20C toward the plane of the plate 11.

Figure 3:
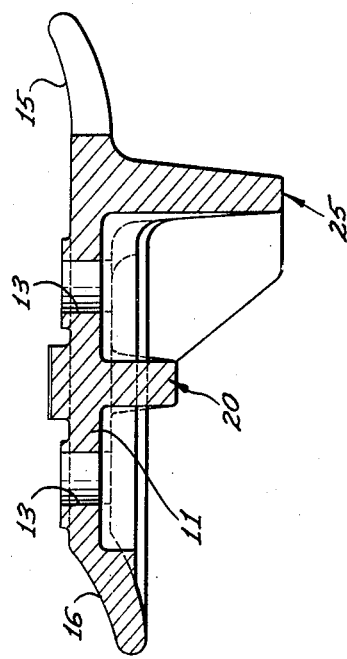
Fig. 3 is a sectional view taken substantially on the line 3—3 of Fig. 1.

Under the present invention, a grouser 25, spaced from the rib 20, projects from the ground engaging side of the plate 11 and extends from one side of the plate 11 to the other. As shown in Fig. 3, the grouser 25 is in the form of a projection or bar of substantially greater height than the rib 20. The grouser 25 in comparison to the face of the plate 11 is relatively narrow and includes a straight medial or central portion 25A, Fig. 1, spaced from and parallel to the medial portion 20M of the rib 20. At the opposite ends, the medial portion 25A of the grouser 25 is off-set at true right angles at 26 and 27 affording a first pair of relatively short stub portions 28 and 29 that are parallel to one another and disposed normal to the medial portion 25A. The grouser stubs 28 and 29 are straight and substantially the same length and project in the same direction, that is, toward the tongues 15. The grouser 25 beyond the off-sets 26 and 27 includes an inner pair of elongated straight lateral extensions 31 and 32. It will be observed in this connection that the lateral portions 31 and 32 of the grouser 25 are parallel to the medial portion 25A and are spaced forwardly thereof at a center line common to the portions 31 and 32 so as to afford a medial pocket P1 between the grouser stubs 28 and 29 and which opens in one direction, that is, toward the tongues 15. The extremities of the lateral extensions 31 and 32 away from the off-sets 26 and 27 are again off-set at 33 and 34 at true right angles to afford another pair of straight parallel short stub portions 36 and 37 which are parallel to the grouser stubs 28 and 29 and which are disposed normal to the extensions 31 and 32. The grouser stubs 36 and 37 are substantially the same length and project in the same direction but opposite to the grouser stubs 28 and 29 so as to afford a pair of pockets P2 and P3 which open in a direction opposite to the pocket P1, that is, away from the tongues 15. The grouser 25 is again elongated at 40 and 41 beyond the off-sets 33 and 34, and the relation is such that the extensions 40 and 41 are parallel to the extensions 31 and 32 and are each disposed on a center line common to the medial portion 25A of the grouser 25. The outer portions 40 and 41 terminate at tapered end walls 40E and 41E tapered downwardly to the plane of the ground engaging face of the plate 11.

It will be seen that under the present invention, the off-sets 26, 27, 33 and 34 provide increased lateral traction against side slippage inasmuch as at these intermediate portions the grouser 25 is provided with traction normal to the general forward or reverse path of the track of the vehicle.

While the invention has been described with reference to a shoe 10 of the kind adapted to be removably attached to the track of the vehicle, it will be readily appreciated that the invention may be embodied as well in a crawler shoe having a plate as 11 cast integral with the track link.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claim.

I claim:

In a ground engaging crawler shoe for an endless track vehicle, a plate adapted to advance with the track of the vehicle to afford traction therefor, and a grouser formed on said plate and projecting from the ground engaging side thereof, said grouser being in the form of a one-piece relatively narrow projection extending laterally from one side of said plate to the other in normal relation to the path of travel of said track, said grouser including an elongated straight intermediate portion located medially of said plate affording forward and reverse traction, a pair of relatively short and spaced apart straight parallel right-angled grouser stubs formed at each extreme end of said intermediate portion and affording increased lateral traction, said grouser stubs being substantially the same length and extending in one direction normal to said intermediate portion, said grouser stubs connecting said intermediate portion of the grouser with a pair of inner tractive extensions of the grouser that extend laterally beyond said stubs on a common center line and which are spaced from and parallel to said intermediate portion of the grouser so as to afford additional forward and reverse traction, said grouser stubs defining a medial pocket in cooperation with the intermediate grouser portion and which opens in one direction, an additional pair of relatively short and spaced-apart straight parallel right-angled grouser stubs formed at the ends of said inner tractive extensions which are outward of the first-named grouser stubs, said additional pair of grouser stubs being substantially of the same length and projecting in the same direction but opposite to the projecting direction of the first-named grouser stubs so as to cooperate with the first-named grouser stubs and said tractive extensions to define a pair of pockets which open in the same direction but opposite to the direction in which the first-named pocket opens, and an outer pair of tractive extensions joined to the ends of the second-named grouser stubs which are remote from the ends of the second-named grouser stubs joined to the first-named tractive extensions, said outer pair of tractive extensions being straight and on a common center line one with another and parallel to the common center line of the first-named tractive extensions.

References Cited in the file of this patent

UNITED STATES PATENTS

| 1,261,827 | McCollum | Apr. 9, 1918 |
| 1,455,490 | Holt | May 15, 1923 |
| 1,605,144 | Reuter | Nov. 2, 1926 |
| 2,050,936 | Ebing | Aug. 11, 1936 |